April 29, 1958     W. C. CLAY     2,832,905
ELECTRICAL GENERATOR

Filed Nov. 30, 1955     2 Sheets-Sheet 1

WALLACE C. CLAY
*INVENTOR.*

BY *John J. Pederson*

HIS ATTORNEY.

April 29, 1958 W. C. CLAY 2,832,905
ELECTRICAL GENERATOR
Filed Nov. 30, 1955 2 Sheets-Sheet 2

WALLACE C. CLAY
*INVENTOR.*

BY *John J. Pederson*

HIS ATTORNEY.

United States Patent Office 2,832,905
Patented Apr. 29, 1958

2,832,905

ELECTRICAL GENERATOR

Wallace C. Clay, Chicago, Ill., assignor to Zenith Radio Corporation, a corporation of Illinois Application November 30, 1955, Serial No. 550,008

5 Claims. (Cl. 310—90)

This invention relates to rotating electrical machinery and more particularly to electrical generators for developing substantially distortion-free sinusoidal output voltages.

Many electrical systems require generators which produce a sine-wave output having as little distortion as is practical. Small generators of this type find widespread application, for example, in position indicating systems and the like. Such generators are also employed to generate a sine-wave voltage, which is coupled through a 90° phase-shifting network and utilized in conjunction with the original wave form to deflect a cathode-ray beam in a circular path. In small generators having power outputs of the order of 10 watts, a slight misalignment of the rotor shaft or some imperfection in manufacturing may cause the output voltage wave form to be modulated by a rotational ripple component, which modulation depends upon the nature and extent of the defect. Manufacturing methods and equipment render the cost of machining parts to extremely close tolerances too high for mass production use; therefore, some device to minimize the undesirable rotational ripple modulation would greatly facilitate the production of accurate, distortion-free, sine-wave generators.

It is an object of this invention to provide an electrical generator for generating a sinusoidal output voltage, in which the amplitude of the rotational ripple voltage is minimized.

In accordance with the invention, an electric generator comprises a stator structure which includes a fixed bearing centered about a predetermined axis. A collar has a central bearing and is supported with its bearing centered about the predetermined axis. The rotor includes a shaft journalled in both of the bearings in a reference position which is co-axial with the stator structure. The collar is displaceable transversely with respect to the predetermined axis, to move the end of the shaft journalled in the central bearing to any position within a predetermined locus which totally encompasses the reference position.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
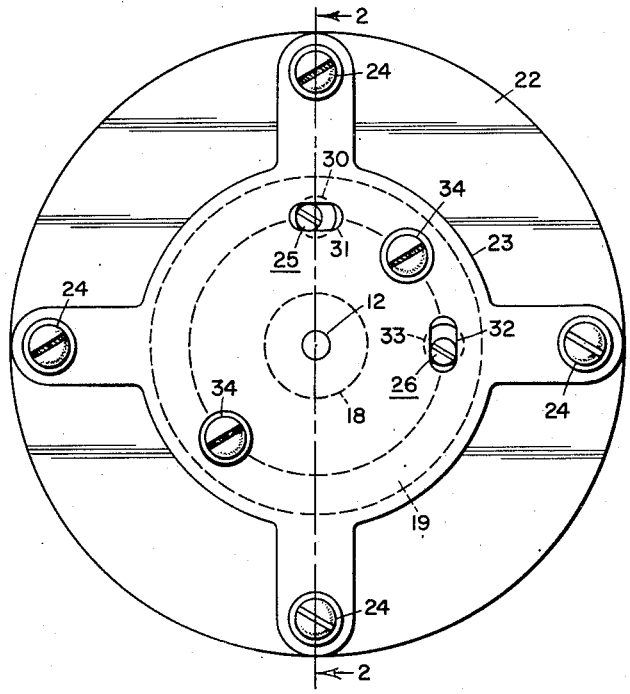
Figure 1 is an end view of a preferred embodiment of the invention.
Figure 4:
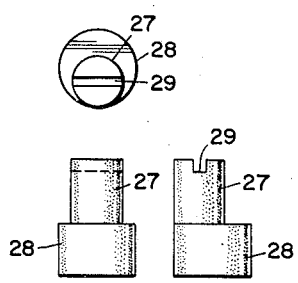

Figures 4a, 4b, and 4c are top, front, and side views, respectively, of an element of the embodiment shown in Figure 1.

Figure 2:
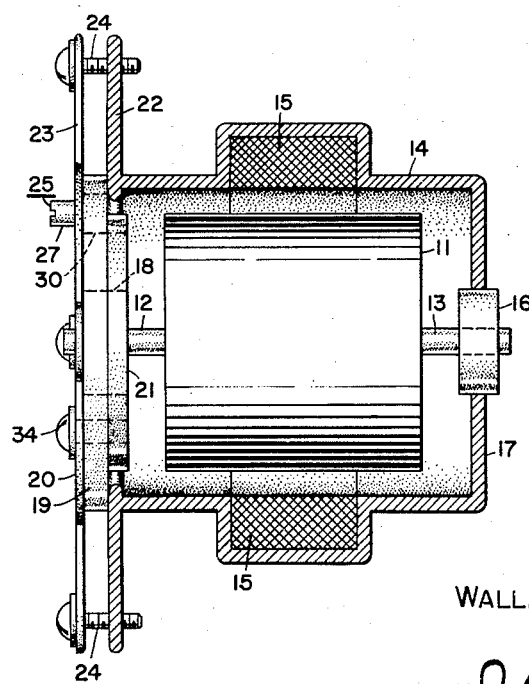
Figure 2 is a sectional view, taken along line 2—2 of Figure 1.

In Figures 1 and 2, a rotor 11, having shaft extensions 12 and 13, is housed within a stator structure 14; the usual field windings 15 are also disposed within stator structure 14, and rotor 11 contains conventional armature windings (not shown). Shaft extension 13 is journalled in a fixed bearing 16, which is centered by a press fit in an end plate 17.

Shaft extension 12 is journalled in a central bearing 18 secured by a press fit within a circular collar 19, which has a front portion 20 of larger diameter, and a rear portion 21 of smaller diameter. The rear surface of front portion 20 is urged against an end plate 22 of the stator housing by pressure from a friction plate 23, which engages collar 19 and is secured to end plate 22 by screws 24.

In accordance with the invention two eccentrics 25 and 26, which are described and shown more fully hereinafter, have upper portions of reduced cross section extend through oval channels 31 and 32, respectively, coordinately spaced from the center of friction plate 23, and their eccentric cylindrical lower portions are journalled in mating cylindrical bearing surfaces 30 and 33, respectively, bored in collar 19. Two locking screws 34 are passed through suitable apertures in friction plate 23 and threaded into corresponding threaded holes of collar 19.

Figure 3:
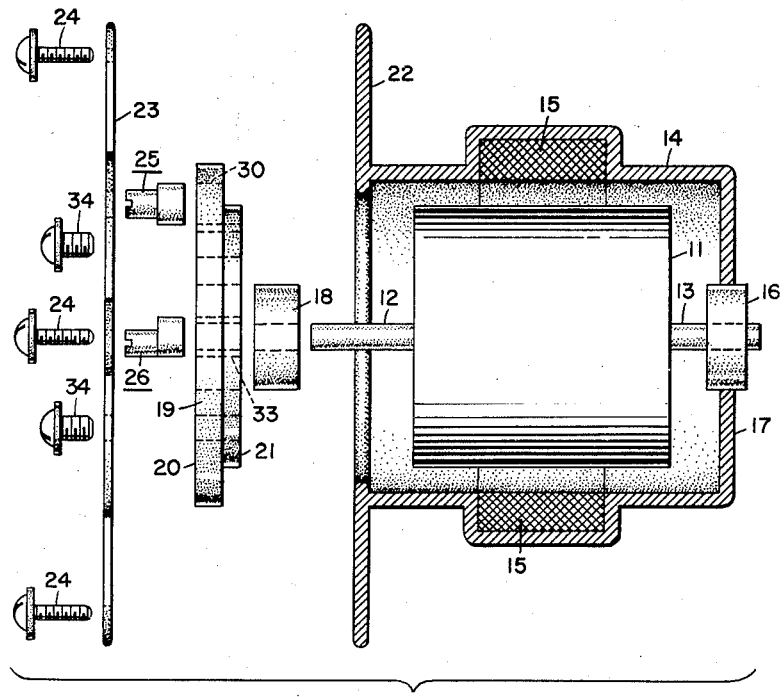
Figure 3 is an exploded view of the embodiment shown in Figure 1.

Figure 3 illustrates the assembly of the several elements of the invention. Bearing 18 is pressed into collar 19, and the resulting assembly is journalled on shaft extension 12. The lower portions of eccentrics 25 and 26 are inserted into corresponding apertures of collar 19, and friction plate 23 is secured over the upper portions of eccentrics 25 and 26 by four screws 24. Two locking screws 34 are passed through apertures in friction plate 23 into corresponding threaded holes in collar 19, to fix the relative positions of friction plate 23 and collar 19.

Figures 4a, 4b, and 4c are top, front, and side views, respectively, of eccentrics 25 and 26, which are identical pieces. Each eccentric comprises an upper cylindrical reference portion 27 joined to and axially offset from a lower enlarged cylindrical portion 28. A slot 29 for receiving a screwdriver or similar adjusting tool is provided in the top surface of upper portion 27. The lower cylindrical portion of each eccentric is proportioned to fit snugly but rotatably in the corresponding apertures provided in collar 19. Upper cylindrical portions 27 of the eccentrics are slightly smaller in diameter than the width of oval channels 31 and 32 of friction plate 23 for indexing purposes, and slide in channels 31 and 32 as collar 19 is displaced with respect to friction plate 23.

The operation of the invention is best described in connection with Figures 1 and 2. After the generator has been assembled, rotor 11 is mechanically centered about a predetermined axis to lie in a reference position which is co-axial with the stator structure. For final adjustment of collar 19 between friction plate 23 and end plate 22, an oscilloscope is connected to the output voltage terminals of the generator (not shown). Locking screws 34 are loosened, so that collar 19 is maintained in position only by end plate 22 and friction plate 23. The generator is energized and the output voltage wave form observed on the oscilloscope. In accordance with the invention, a screwdriver or similar tool is used to alternately rotate eccentrics 25 and 26. As either eccentric is turned, collar 19 is pivoted about the other eccentric, effecting a slight transverse movement of bearing 18 and shaft extension 12 with respect to the original, or reference, position. Rotation of the eccentrics permits movement of shaft extension 12 within an adjustment locus which totally encompasses the original or axial position of shaft extension 12, that of co-axial alignment between rotor and stator structures. Because the axes of oval channels 31 and 32 are positioned at right angles relative to each other, alternate rotation of eccentrics 25 and 26 generates a curvilinear square adjustment locus. Alternative eccentric or other adjustment means may of course be employed, and the slots may be mutually oriented in different ways, but as the angle between the slots is decreased, the adjustment locus is simultaneously compressed in one direction and expanded along an axis perpendicular to the curtailed direction. Moreover, more or less extensive adjustment loci may be obtained by varying the number and relative disposition of eccentrics; even the provision of a single eccentric is sufficient to permit substantial reduction of rotational ripple. However, it has been found that the illustrated construction is particularly suitable for correcting the output waveform of generators produced with ordinary manufacturing tolerances and speeds final adjustment by providing ample displacement in all directions from the reference position of shaft extension 12.

As either eccentric is rotated, the output voltage wave form is observed; when minimum rotational ripple appears superimposed on the waveform, the other eccentric is then rotated to further reduce the ripple. After several alternate adjustments the rotational ripple in the output voltage wave form is minimized, and the position of shaft 12 is then fixed by tightening locking screws 34, which secure collar 19 adjacent friction plate 23. The oscilloscope is disconnected, and the generator is de-energized.

The alignment of generators incorporating the invention is simple, and is accomplished while the generator is in operation to give an accurate indication of the actual rotational ripple in the generator output. Minute adjustments of the eccentrics have been found to reduce the rotational ripple component to a negligible percentage of the output voltage amplitude; this reduction has amounted to an order of magnitude change in generators having an output of approximately ten watts and operated at speeds from 5,000 to 30,000 revolutions per minute. Such adjustment compensates for small aberrations resulting from errors in manufacturing, and permits a generator to produce a practically distortion-free output without the disadvantage of requiring the manufacturing process to be accomplished within prohibitively small tolerances.

While a particular embodiment of the invention has been shown and described, it is apparent that modifications and alterations may be made, and it is intended in the appended claims to cover all such modifications and alterations as may fall within the true spirit and scope of the invention.

I claim:

1. An electrical generator comprising: a stator structure including a bearing centered about a predetermined axis; a collar having a central bearing; means secured to said stator structure for supporting said collar with its bearing centered about said axis; a rotor including a shaft journalled in said bearings in a reference position coaxial with said stator structure; and means for displacing said collar transversely with respect to said axis while said generator is operating to move said shaft to any position within a predetermined locus totally encompassing said reference position, whereby rotational ripple component in the output voltage of said generator may be minimized.

2. An electrical generator comprising: a stator structure including a bearing centered about a predetermined axis; a collar having a central bearing; means including a friction plate secured to said stator structure for supporting said collar with its bearing centered about said axis; a rotor including a shaft journalled in said bearings in a reference position coaxial with said stator structure; and eccentric means for displacing said collar transversely with respect to said axis while said generator is operating to de-center said shaft to any position within a predetermined locus totally encompassing said reference position, whereby rotational ripple component in the output voltage of said generator may be minimized.

3. An electrical generator comprising: a stator structure including a fixed bearing centered about a predetermined axis; a collar having a central bearing; means including a friction plate secured to said stator structure for supporting said collar with said central bearing centered about said axis; a rotor including a first shaft extension journalled in said fixed bearing, and a second shaft extension journalled in said central bearing in a reference position coaxial with said stator structure; and means, including an eccentric having a reference portion indexed in said friction plate and an axially displaced portion journalled in said collar, for displacing said collar transversely with respect to said axis while said generator is operating to de-center said second shaft extension to any position within a predetermined locus totally encompassing said reference position, whereby rotational ripple component in the output voltage of said generator may be minimized.

4. An electrical generator comprising: a stator structure including a fixed bearing centered about a predetermined axis; a collar having a central bearing; means including a friction plate secured to said stator structure for supporting said collar with said central bearing centered about said axis; a rotor including a first shaft extension journalled in said fixed bearing, and a second shaft extension journalled in said central bearing in a reference position coaxial with said stator structure; and means, including a plurality of eccentrics having reference portions indexed in said friction plate at locations co-ordinately spaced from said axis and having axially displaced portions journalled in said collar, for displacing said collar transversely with respect to said axis while said generator is operating to de-center said second shaft extension to any position within a predetermined locus totally encompassing said reference position, whereby rotational ripple component in the output voltage of said generator may be minimized.

5. The method of minimizing the amplitude of rotational ripple component in the output voltage of an electrical generator of the type including a rotor and a stator, comprising: energizing said generator; and thereafter progressively misaligning said rotor with respect to said stator while said generator is energized until said ripple component is minimized.

References Cited in the file of this patent
UNITED STATES PATENTS

| | | |
|---|---|---|
| 1,122,213 | Mattman | Dec. 22, 1914 |
| 1,749,196 | Strohmeier | Mar. 4, 1930 |